United States Patent
Stephens et al.

(10) Patent No.: US 9,248,738 B2
(45) Date of Patent: Feb. 2, 2016

(54) POWER TRANSFER UNIT FOR AWD VEHICLES HAVING INTEGRATED JOINT ASSEMBLY

(71) Applicant: Magna Powertrain of America, Inc., Troy, MI (US)

(72) Inventors: Carl F. Stephens, Liverpool, NY (US); William A. Hellinger, Mexico, NY (US); Dale R. Fine, Cicero, NY (US)

(73) Assignee: Magna Powertrain of America, Inc., Troy, MI (US)

( * ) Notice: Subject to any disclaimer, the term of this patent is extended or adjusted under 35 U.S.C. 154(b) by 2 days.

(21) Appl. No.: 14/108,891

(22) Filed: Dec. 17, 2013

(65) Prior Publication Data

US 2014/0174253 A1 Jun. 26, 2014

Related U.S. Application Data

(63) Continuation-in-part of application No. 13/603,152, filed on Sep. 4, 2012, now Pat. No. 8,607,666, which is a continuation of application No. 12/481,814, filed on Jun. 10, 2009, now Pat. No. 8,256,328.

(51) Int. Cl.
*B60K 17/22* (2006.01)
*B60K 17/34* (2006.01)
*B60K 23/08* (2006.01)

(52) U.S. Cl.
CPC .............. *B60K 23/08* (2013.01); *B60K 17/22* (2013.01); *B60K 17/34* (2013.01); *Y10T 74/19074* (2013.01)

(58) Field of Classification Search
CPC ......... F16H 48/22; F16H 48/11; F16H 48/10; F16H 48/08; F16H 48/26; F16H 48/05; B60K 17/3462; B60K 17/22; B60K 17/34; B60K 23/08; B25J 17/0275; B60T 13/02; Y10T 74/19074; Y10T 74/19107; Y10T 74/19056
USPC ...... 74/665 B, 665 F, 665 C, 665 D, 665 GC, 74/665 G; 475/202, 221, 222, 225, 303; 180/235, 248, 233; 403/57, 58, 73, 74, 403/75
See application file for complete search history.

(56) References Cited

U.S. PATENT DOCUMENTS

| | | | |
|---|---|---|---|
| 2,698,527 A | | 1/1955 | Anderson |
| 4,688,447 A | | 8/1987 | Dick |
| 4,779,699 A | * | 10/1988 | Hatano .................... 180/248 |
| 4,817,753 A | * | 4/1989 | Hiketa .................... 180/249 |
| 4,860,612 A | | 8/1989 | Dick et al. |
| 5,116,293 A | | 5/1992 | Reuter |

(Continued)

*Primary Examiner* — Jude Agendia
(74) *Attorney, Agent, or Firm* — Dickinson Wright PLLC (57) ABSTRACT

A power transmission device for a four-wheel drive vehicle includes an input shaft adapted to be driven by a power source. A first output shaft is rotatable about a first axis and adapted to transmit torque to a first driveline. A second output shaft is adapted to transmit torque to a second driveline and is rotatable about a second axis. The first and second axes diverge from one another. A transfer unit includes a drive member rotatably supported on the first output shaft and a driven member coupled to the second output shaft. A joint is positioned within a cavity formed in the driven member and drivingly interconnects the driven member and the second output shaft. The driven member includes first and second portions separable from and re-mountable to each other to allow service to the joint.

11 Claims, 9 Drawing Sheets

(56) References Cited

U.S. PATENT DOCUMENTS

| | | |
|---|---|---|
| 5,188,574 A * | 2/1993 | Echigo et al. ............. 475/206 |
| 5,226,860 A | 7/1993 | Baxter, Jr. et al. |
| 5,376,051 A | 12/1994 | Valencic |
| 5,618,234 A | 4/1997 | Carden |
| 6,845,690 B2 * | 1/2005 | Gansloser et al. ......... 74/665 R |
| 7,252,616 B2 * | 8/2007 | Wormsbaecher ............. 475/202 |
| 7,399,250 B2 | 7/2008 | Gansloser et al. |
| 2001/0038772 A1 | 11/2001 | Wormsbaecher |
| 2004/0204251 A1 * | 10/2004 | Menosky et al. ............. 464/132 |
| 2005/0188784 A1 | 9/2005 | Knox et al. |
| 2006/0048992 A1 * | 3/2006 | Gansloser et al. ............ 180/233 |
| 2006/0258501 A1 | 11/2006 | Wormsbaecher |
| 2008/0099267 A1 | 5/2008 | Ruehle et al. |
| 2009/0044648 A1 * | 2/2009 | Nakata et al. ................ 74/417 |

* cited by examiner

POWER TRANSFER UNIT FOR AWD VEHICLES HAVING INTEGRATED JOINT ASSEMBLY

CROSS-REFERENCE TO RELATED APPLICATIONS

This application is a continuation-in-part of U.S. application Ser. No. 13/603,152 filed Sep. 4, 2012, now U.S. Pat. No. 8,607,666, which is a continuation of U.S. application Ser. No. 12/481,814 filed on Jun. 10, 2009, now U.S. Pat. No. 8,256,328. The entire disclosure of each of the above applications is incorporated herein by reference.

FIELD

The present disclosure relates generally to a power transmission device for use in a motor vehicle. More particularly, the present disclosure describes a power transfer unit, such as a transfer case or a power take-off unit, having a shaft assembly equipped with a cardan joint.

BACKGROUND

Many sport-utility vehicles are equipped with a transfer case for transmitting drive torque to all four of the wheels, thereby establishing a four-wheel drive mode of operation. Some transfer cases are equipped with a mode shift mechanism which permits the vehicle operator to selectively shift between a two-wheel drive mode wherein only a primary (i.e., rear) driveline is driven and a "part-time" four-wheel drive mode wherein a secondary (i.e., front) driveline is rigidly coupled for rotation with the primary driveline.

In the past, the vehicle ride height and suspension configuration of many sport-utility vehicles provided sufficient packaging volume for a traditional transfer case having at least two rotating output shafts extending parallel to one another. In view of increased consumer demand for smaller four-wheel drive vehicles, the packaging volume allocated to the vehicle powertrain has been greatly reduced. While traditional transfer case designs may function in a satisfactory manner in certain vehicle applications, a need for an improved, compact, lightweight power transmission device exists.

In addition to such four-wheel drive vehicles, many all-wheel drive vehicles are now available which typically provide a two-wheel drive mode where the primary (i.e. front) driveline is driven and further provide an all-wheel drive mode where the secondary (i.e. rear) driveline is also driven. In most all-wheel drive vehicles, a power take-off unit is configured to transfer drive torque from the primary driveline to the secondary driveline via a transfer assembly and propshaft. Examples of single-speed and two-speed power take-off units and their arrangement in all-wheel drive vehicular applications are disclosed in commonly-owned U.S. Pat. Nos. 8,313,407 and 8,403,795.

Similarly to the packaging requirement of transfer cases in smaller 4WD vehicles, a need exists to provide compact power take-off units for use in smaller AWD vehicles.

SUMMARY OF THE INVENTION

It is an object of the present disclosure to provide a power transmission device for use in a four-wheel drive (4WD) vehicle or an all-wheel drive (AWD) vehicle having a shaft assembly equipped with an integrated joint assembly.

It is a related object of the present disclosure to configure the power transmission device as a transfer case for use in four-wheel drive vehicles and which has a joint assembly integrated into a front output shaft assembly.

It is another related object of the present disclosure to configure the power transmission device as a power take-off unit for use in all-wheel drive vehicles and which has a joint assembly integrated into a rear output assembly.

It is yet another object of the present disclosure to configure the power transmission device as a drive module for use in conjunction with a secondary axle of a motor vehicle and which has a joint assembly integrated into an input shaft assembly.

A power transmission device for use in a four-wheel drive vehicle includes a transfer case having an input shaft adapted to be driven by a power source. A first output shaft is rotatable about a first axis and is adapted to transmit torque to a first driveline. A second output shaft is adapted to transmit torque to a second driveline. The second output shaft is rotatable about a second axis. A transfer unit includes a drive member rotatably supported on the first output shaft and a driven member coupled to the second output shaft. The drive member and the driven member are in a torque transferring arrangement with one another. A joint is positioned within a socket or cavity formed in the driven member and drivingly interconnects the driven member and the second output shaft. The driven member includes a shell unit having first and second shell portions that are separable from and re-mountable to each other to allow service to the joint.

A power transmission device for use in an all-wheel drive vehicle includes a power take-off unit having an input shaft driven by the power source about a first axis, an output shaft adapted to be coupled to the secondary driveline and rotatable about a second axis, a transfer unit driving the output shaft, and a clutch for selectively connecting and disconnecting the transfer unit and the input shaft. The transfer unit includes a transfer gearset driving a hypoid gearset. The clutch is arranged to selectively connect and disconnect the transfer gearset to the input shaft. The hypoid gearset includes a ring gear rotatable about a third axis arranged generally parallel to the first axis and a pinion gear meshed with the ring gear and which is rotatable about a fourth axis that is arranged transversely with respect to the first and third axes. A joint is disposed within a cavity formed in the pinion gear which drivingly interconnects the pinion gear and the output shaft and allows pivotal movement of the output shaft relative to the fourth axis.

A power transmission device for use in conjunction with an axle assembly includes a drive module having an input shaft, a hypoid gearset driving a differential assembly of the axle assembly, and a clutch for selectively connecting and disconnecting the hypoid gearset and the input shaft. The clutch includes a first clutch member, a second clutch member driving the hypoid gearset, a friction clutch pack operably disposed between the first and second clutch members, and an actively-controlled clutch actuator. The drive module further includes a joint positioned within a cavity formed in the first clutch member and drivingly connecting the input shaft to the first clutch member.

BRIEF DESCRIPTION OF THE DRAWINGS

The disclosure will now be described, by way of example, with reference to the accompanying drawings in which.

DETAILED DESCRIPTION OF THE PREFERRED EMBODIMENTS

In general, the present disclosure relates to a power transmission device for a motor vehicle having a first shaft rotatable about a first axis and a second shaft that rotates about a second axis of rotation. The first and second axes need not extend parallel to one another. A clutch actuation system may actuate a clutch assembly associated with the first and second shafts of the power transmission device for selectively or automatically shifting between a four-wheel drive mode (or all-wheel drive mode) and a two-wheel drive mode. A cardan joint is associated with one of the shafts to allow the shaft to rotate about its axis that need not extend parallel to the other axis.

Figure 1:
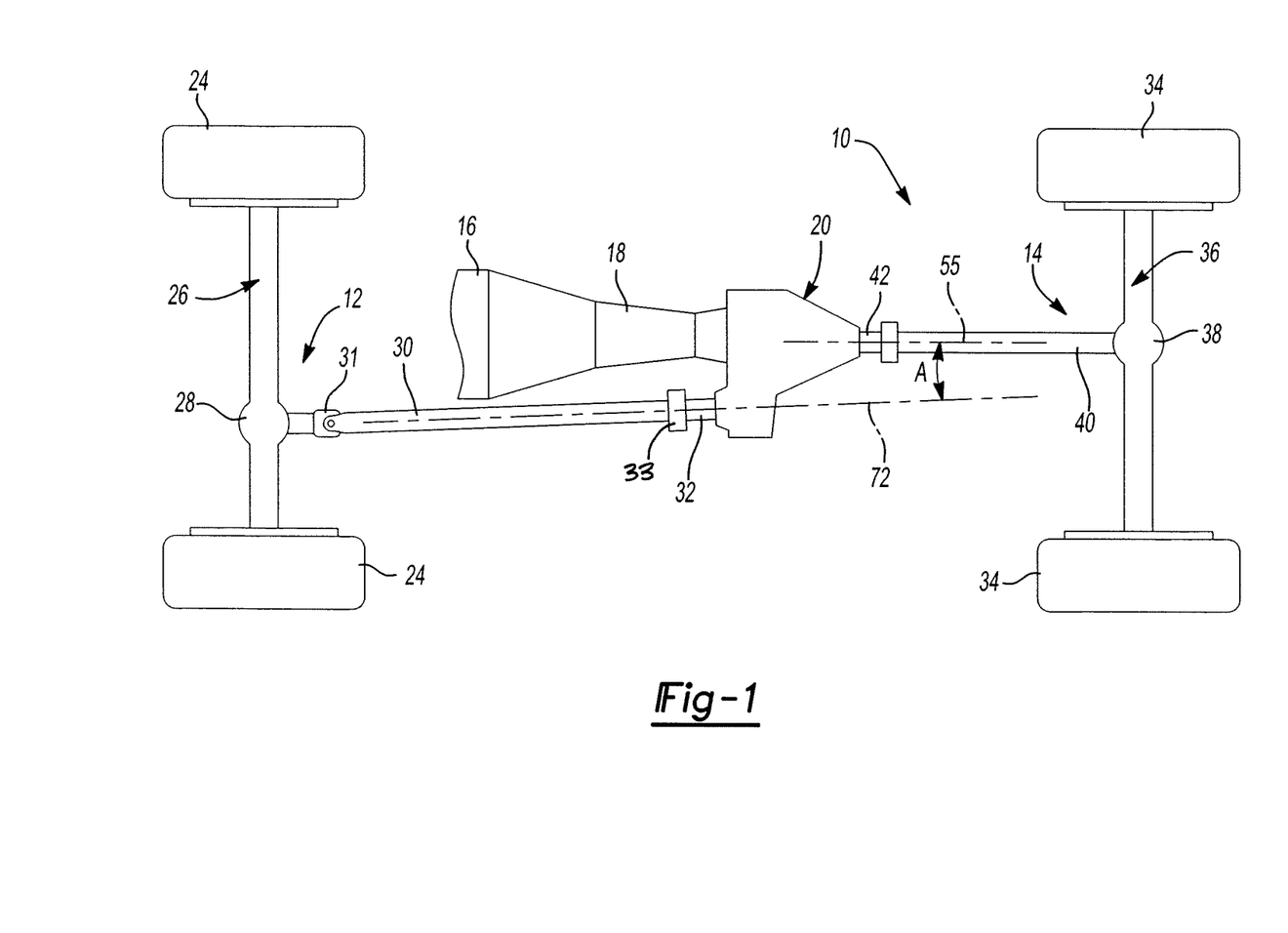
FIG. 1 is a schematic illustrating a four-wheel drivetrain arrangement for a motor vehicle and which is equipped with a power transmission device of the present disclosure.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive arrangement which incorporates a power transmission device 20 for transmitting rotary power (i.e. drive torque) from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propeller shaft 30 by a cardan joint 31. A constant velocity joint may be used in lieu of cardan joint 31. The opposite end of front propeller shaft 30 is coupled by a coupling unit 33 to a second or front output shaft assembly 32 of power transmission device 20. Similarly, rear driveline 14 includes a pair of rear wheels 34 connected at opposite ends of a rear axle assembly 36 having a rear differential 38 coupled to one end of a rear propeller shaft 40, the opposite end of which is interconnected to a first or rear output shaft 42 of power transmission device 20.

Figure 2:
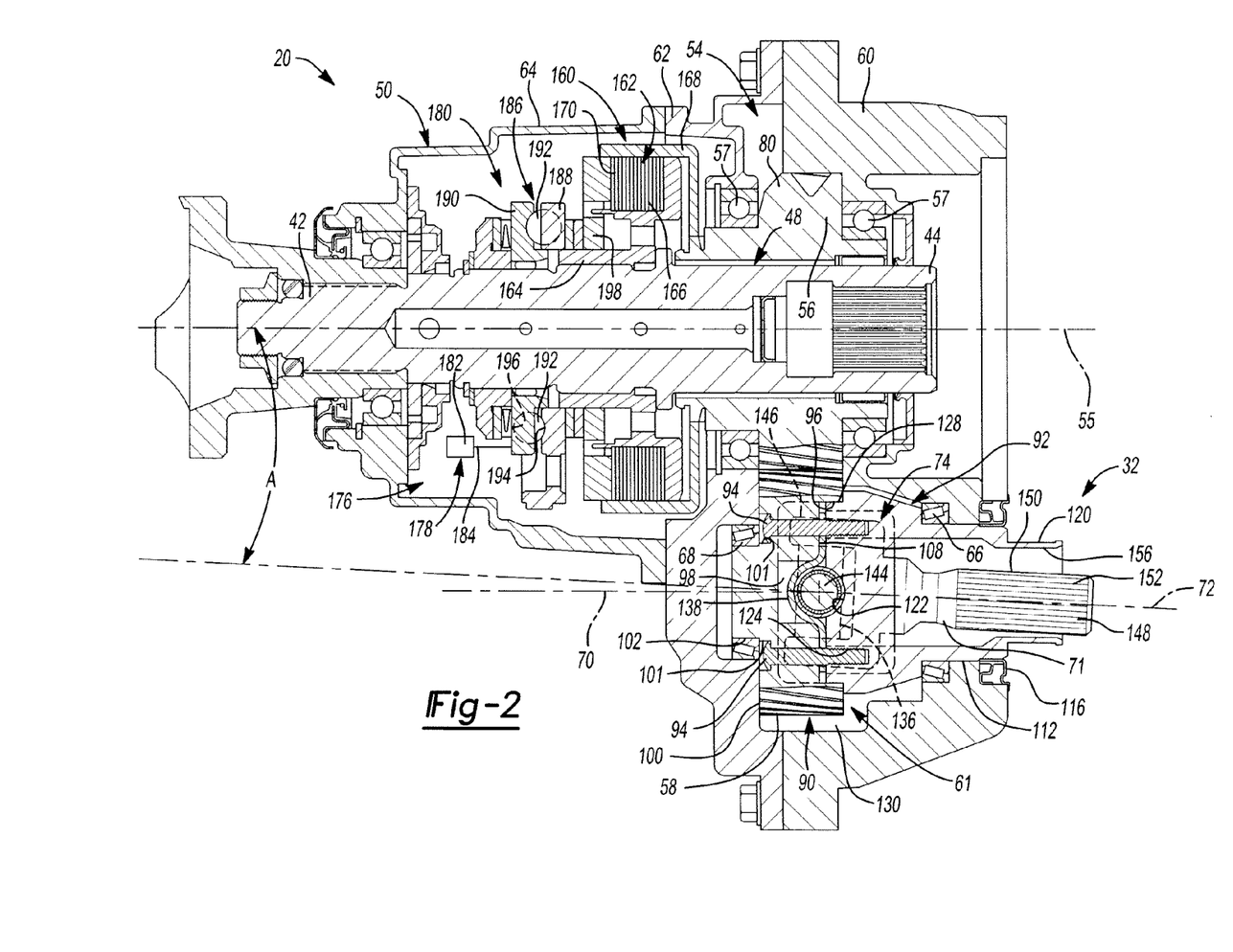
FIG. 2 is a cross-sectional view of the power transmission device according to the present disclosure.

With particular reference to FIG. 2 of the drawings, power transmission device 20 is shown as a transfer case having an input shaft 44 adapted for connection to an output shaft of transmission 18 such that both are rotatably driven by engine 16 of the motor vehicle. In the arrangement depicted, rear output shaft 42 is integrally formed with input shaft 44 as a one-piece mainshaft 48 that is rotatably supported in a housing assembly 50. Housing assembly 50 includes separable first, second and third housings 60, 62 and 64, respectively. Second output shaft assembly 32 is also rotatably supported in housing assembly 50.

A transfer assembly 54 is provided for selectively transferring drive torque from mainshaft 48 to second output shaft assembly 32. Transfer assembly 54 includes a first or drive gear 56 rotatably supported within housing assembly 50 by bearings 57. Drive gear 56 is also rotatably supported on mainshaft 48. Mainshaft 48 is rotatable about a first axis 55 relative to drive gear 56. Transfer assembly 54 also includes a second or driven gear 58 that is in constant meshed engagement with drive gear 56. Driven gear 58 is formed as a part of second output shaft assembly 32. More particularly, second output shaft assembly 32 includes a multi-piece shell 61 unit rotatably supported within first housing 60 by a first angular contact bearing 66 and by a second angular contact bearing 68 positioned within second housing 62. As such, shell unit 61 is supported for rotation about a second axis 70. Second axis 70 is depicted as extending parallel to first axis 55. It should be appreciated that second axis 70 may be positioned at an angle relative to first axis 55 and may or may not intersect first axis 55.

Second output shaft assembly 32 also includes a yoke shaft 71 that is rotatable about a third axis 72 based on the use of an integrated cardan joint 74. In FIG. 2, first axis 55 and third axis 72 diverge from one another and define an included angle "A". Based on the geometry of cardan joint 74, third axis 72 always intersects second axis 70 at a point. However, third axis 72 may or may not intersect first axis 55. Angle A is defined as an angle shown taken along a plane containing first axis 55 and a point of intersection between second axis 70 and third axis 72. Such an arrangement may be accomplished by using bevel gears. Accordingly, the term "diverge" may apply to axes that truly intersect one another as well as skew axes that do not intersect. In the example depicted in FIGS. 1 and 2, angle A ranges substantially from 0.5 to 2.5 degrees.

Drive gear 56 is preferably constructed to include gear teeth 80 defining a circular cylindrical outer shape. Teeth 80 may be straight spur-type gear teeth or alternatively may be helically-shaped. Driven gear 58 includes a set of circumferentially spaced apart gear teeth 82 that are in constant meshed engagement with teeth 80 of drive gear 56. Teeth 82 are also depicted as having a circular cylindrical shape. It should be appreciated that alternate transfer assemblies are contemplated for use within power transmission device 20. For example, one or more beveled gears may be substituted for drive gear 56 and/or driven gear 58. A set of sprockets drivingly interconnected by a chain may also be substituted as long as the driven member houses cardan joint 74.

Figure 3:
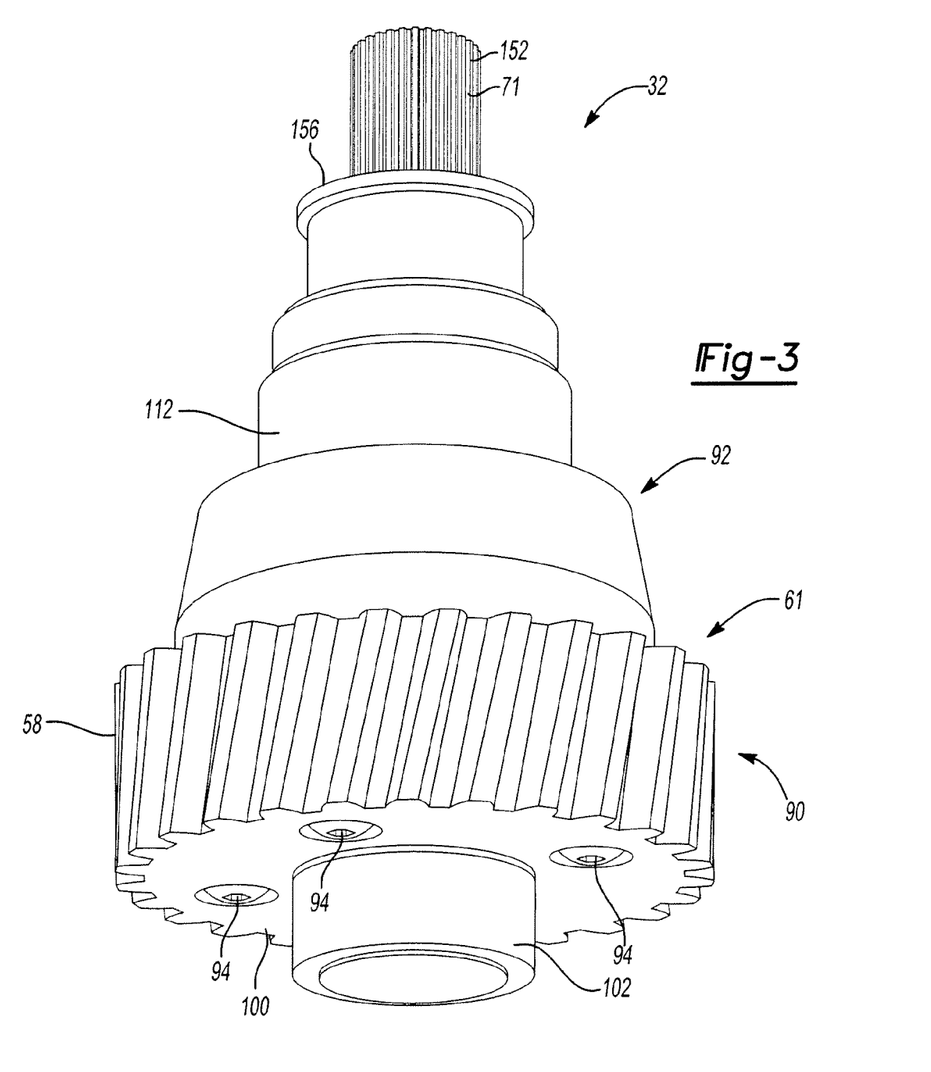
FIG. 3 is a perspective view of a driven member associated with the power transmission device shown in FIG. 2.
Figure 4:
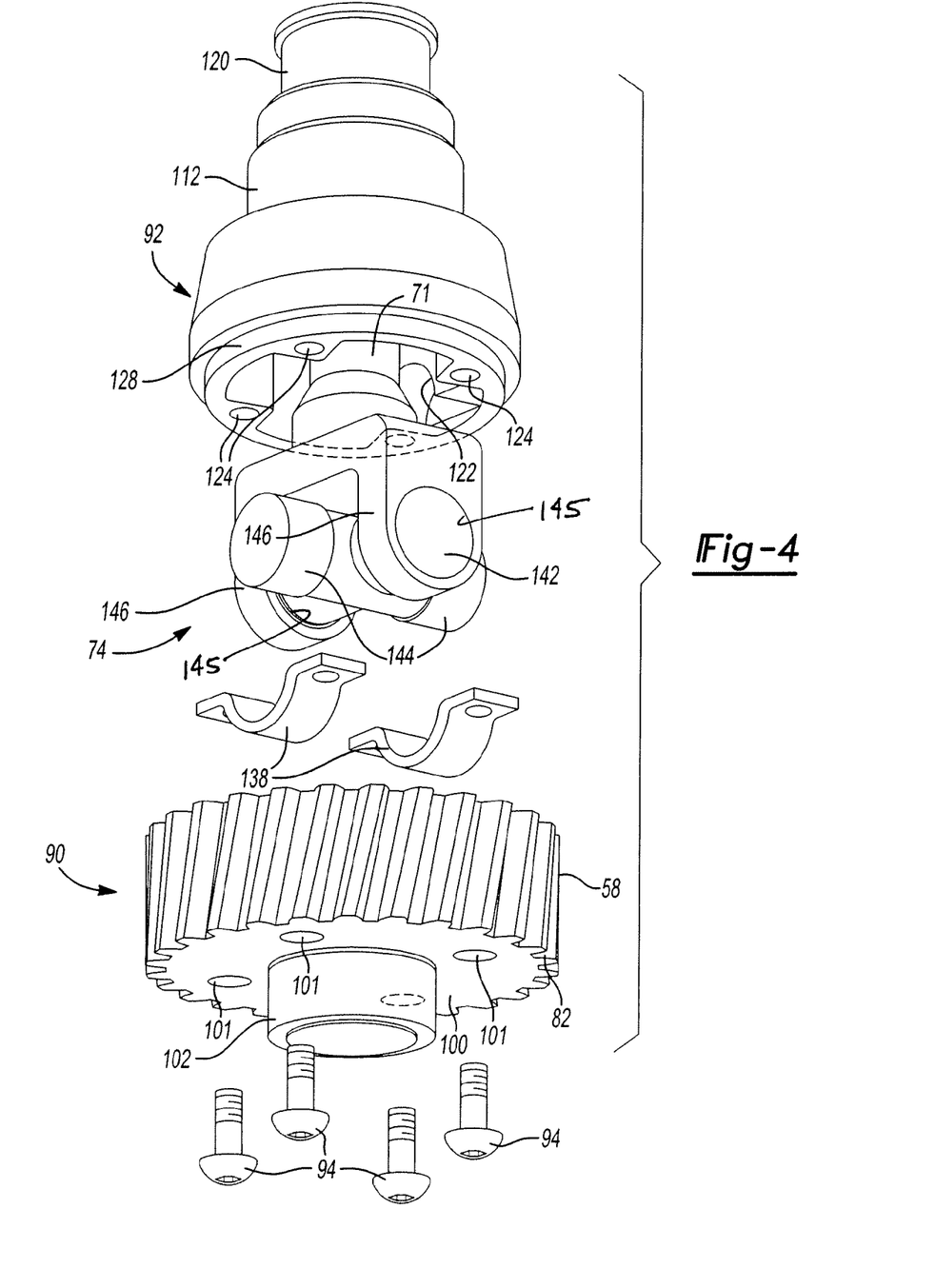
FIGS. 4 and 5 are exploded perspective views of the driven member shown in FIG. 3.
Figure 5:
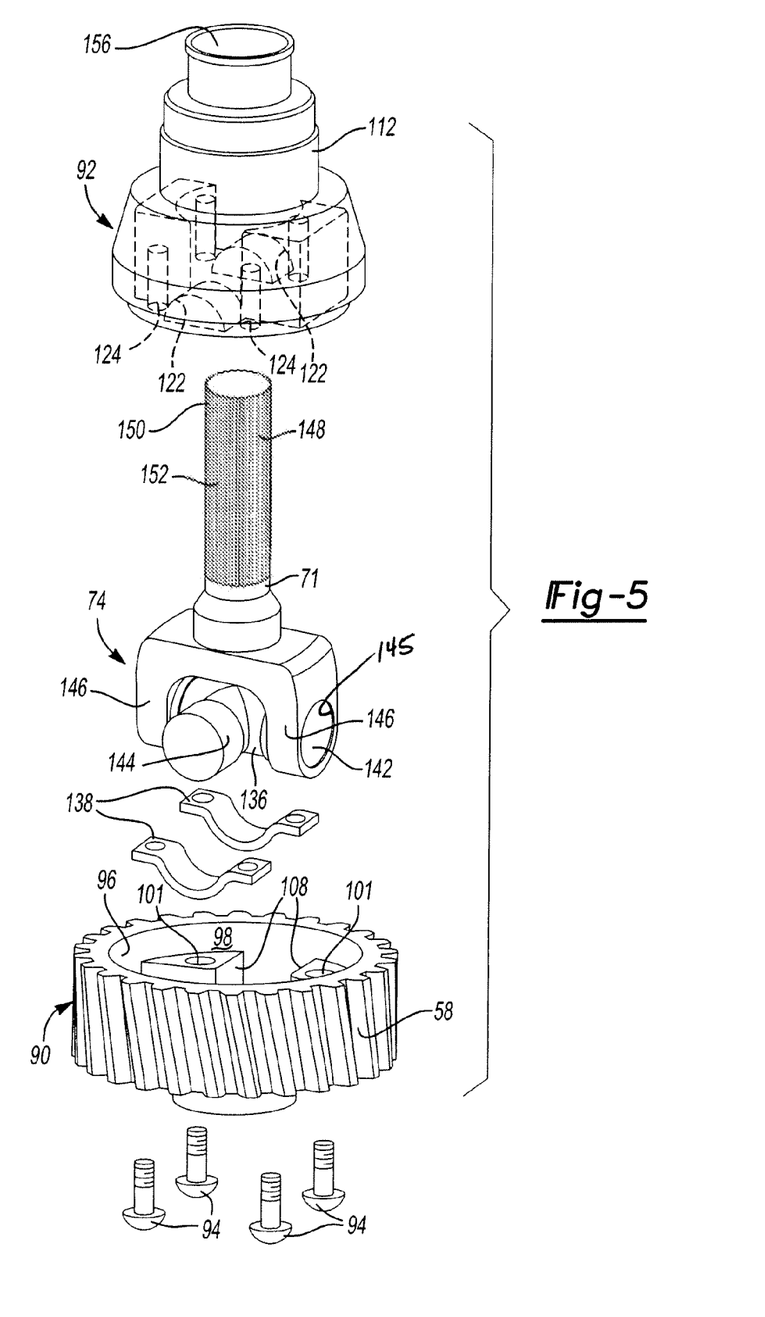

As best shown in FIGS. 3-5, shell unit 61 of second output shaft assembly 32 is a multi-part assembly having a first shell portion 90 fixed to a second shell portion 92 by a plurality of fasteners 94. First shell portion 90 includes an annular rim on which driven gear 58 is formed and which surrounds an inner cylindrical wall 96 defining a recess 98. First shell portion 90 also includes a first or outer end wall 100 having a plurality of through bores 101 sized for receipt of fasteners 94. A first cylindrical hub 102 extends axially from first end wall 100. Angular contact bearing 68 supports hub 102 for rotation in housing assembly 50. Angular contact bearing 68 may include tapered rollers, balls or a variety of other configurations designed to accurately support second output shaft assembly 32 for rotation about the second axis within second housing 62 as well as to react axial loading that may be generated due to the use of cardan joint 74. A plurality of posts 108 extend from end wall 100 into recess 98. Bores 101 extend through posts 108.

Second shell portion 92 of shell unit 61 includes a second cylindrical hub 112 supported for rotation in housing assembly 50 by angular contact bearing 66. A seal assembly 116 restricts contaminants from entering housing assembly 50 while allowing shell unit 61 to rotate relative thereto. Second shell portion 92 also includes a snout 120 protruding from housing assembly 50 to provide an attachment land for a boot (not shown). As best seent in FIGS. 4 and 5, semi-cylindrical journals 122 are formed in second shell portion 92. Threaded apertures 124 are formed in second shell portion 92 on opposite sides of journals 122, with each aperture 124 being in receipt of one of threaded fasteners 94. A cylindrical pilot flange 128 includes an outer diameter sized to closely mate with an inner diameter defined by inner wall 96 upon assembly of second shell portion 92 with first shell portion 90.

Cardan joint 74 is positioned within a cavity 130 defined by first shell portion 90 and second shell portion 92 of shell unit 61. Cardan joint 74 includes yoke of shaft 71, a cross 136 and a pair of straps 138. Cross 136 includes a pair of first trunnions 142 and a pair of second trunnions 144. Yoke shaft 71 includes bifurcated a pair of legs 146 having circular journals 145 supporting the pair of first trunnions 142 for rotation. Journals 122 and straps 138 support the pair of second trunnions 144 for rotation. Straps 138 are sandwiched between posts 108 and second shell portion 92. Fasteners 94 releasably fix first shell portion 90 and straps 138 to second portion 92. Yoke shaft 71 also includes a shaft portion 148 having a distal end 150 with an external spline 152 formed thereon. Distal end 150 of yoke shaft 71 is adapted to be coupled to a first end of front propshaft 30. Shaft portion 148 also extends through an elongated bore 156 in second shell portion 92 of shell unit 61. Shaft portion 148 may be constrained such that axis 72 defines a constant angle A or shaft portion 148 may articulate during operation.

To provide means for establishing a drive connection between mainshaft 48 and second output shaft assembly 32, power transmission device 20 also includes a mode shift mechanism 160. Mode shift mechanism 160 includes a mode clutch 162 which is operable to couple drive gear 56 to mainshaft 48 for establishing a four-wheel drive mode in which second output shaft assembly 32 is drivingly coupled for rotation with mainshaft 48. In addition, mode clutch 162 is operable for selectively decoupling drive gear 56 from mainshaft 48 for establishing a two-wheel drive mode in which all drive torque is delivered to rear driveline 14.

According to the embodiment shown in FIG. 2, mode clutch 162 is normally operable in a non-actuated mode for transmitting all drive torque to rear output shaft 42, thereby establishing the two-wheel drive mode. Mode clutch 162 is also operable in a fully-actuated mode for establishing a "locked" four-wheel drive mode in which front output shaft assembly 32 is rigidly coupled to rear output shaft 42. In the embodiment shown in FIG. 2, mode clutch 162 is a multi-plate friction clutch assembly. Mode clutch 162 may be controlled to progressively regulate the amount of torque transferred to front output shaft assembly 32 automatically (i.e., on-demand) between its non-actuated and fully-actuated modes in response to and as a function of the amount of relative rotation (i.e., interaxle slip) between front output shaft assembly 32 and rear output shaft 42. The torque versus slip characteristics of mode clutch 162 can be tuned to meet specific vehicular applications.

Mode clutch 162 includes an inner hub 164 fixed to mainshaft 48 and to which a set of inner clutch plates 166 are rotatably fixed. Mode clutch 162 also includes a drum 168 fixed for rotation with drive gear 56. Drum 168 is cylindrical and has a set of outer clutch plates 170 rotatably fixed thereto which are alternately interleaved with inner clutch plates 166 to define a multi-plate clutch pack. Other physical arrangements of mode clutch 162 (not shown) may perform the same function and are contemplated as being within the scope of the present disclosure.

A clutch actuation system 176 controls actuation mode clutch 162. Clutch actuation system 176 includes a power-operated actuator 178 and may also include a rotary to linear movement conversion mechanism 180. In particular, actuator 178 includes a drive motor 182 for rotating a drive shaft 184. Drive shaft 184 is coupled to rotary to linear movement conversion mechanism 180. Rotary to linear movement conversion mechanism 180 includes a ball ramp unit 186. Ball ramp unit 186 includes a pair of cam rings 188, 190 and a plurality of balls 192. Each of cam rings 188 and 190 include grooves 194 and 196, respectively. Grooves 194 and 196 have varying depths. Balls 192 are positioned within grooves 194 and 196. When balls 192 are positioned at the deepest portion of grooves 194 and 196, cam rings 188 and 190 are spaced apart a first distance from one another. Cam ring 190 is rotatable relative to cam ring 188 to cause balls 192 to be positioned within the shallow portion of grooves 194 and 196. At this position, cam rings 188 and 190 are spaced apart from one another a distance greater than the first distance. In this manner, ball ramp unit 186 is operable to convert rotary motion to linear motion.

In operation, clutch actuation system 176 is controlled to apply a clutch engagement force on the mode clutch 162. Drive motor 182 rotates drive shaft 184 in a first direction which rotates cam ring 190 relative to cam ring 188 to axially move cam ring 188 and apply the clutch engagement force to an apply plate 198. Inner clutch plates 166 are frictionally engaged with outer clutch plates 170 by apply plate 198 to transfer drive torque from rear output shaft 42 to front output shaft assembly 32. Rotating drive motor 182 in the reverse direction rotates cam ring 190 back to a start position thereby removing the clutch engagement force from mode clutch 162. Thus, second output shaft assembly 32 is no longer driven by mainshaft 48. Alternatively, actuator 178 need not be configured to include a drive motor but may utilize other force transmitting mechanisms as appropriate. Furthermore, it should be appreciated that the clutch actuation system previously described may be replaced with a variety of other force application devices including hydraulically or electrically powered pumps acting on one or more pistons, motors driving one or more gearsets and power screws, among others.

Figure 6:
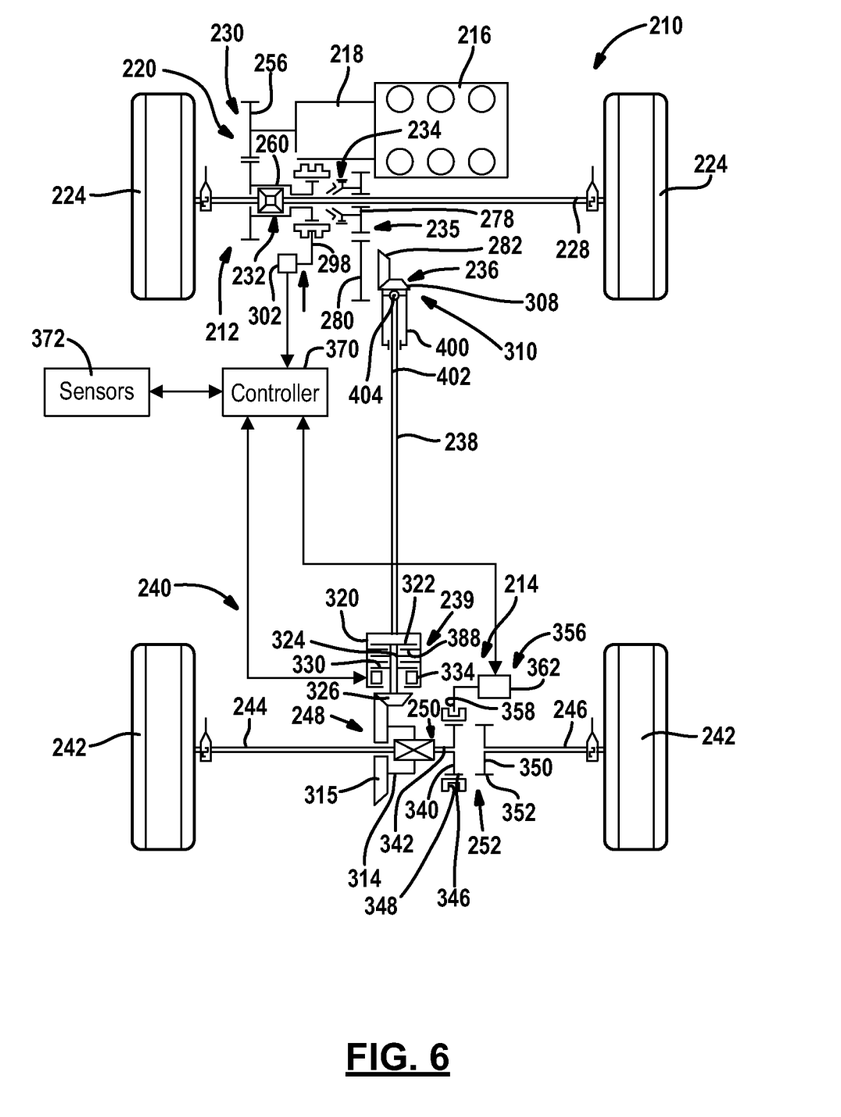
FIG. 6 is a schematic illustrating an all-wheel drivetrain arrangement for a motor vehicle which is equipped with a power transmission device constructed in accordance with the present disclosure.

With particular reference to FIG. 6 of the drawings, a drive train 210 of a four-wheel drive vehicle is shown. Drivetrain 210 includes a front driveline 212 and a rear driveline 14 both drivable from a source of power, such as an engine 216 through a transmission 218 which may be of either the manual or automatic type. In the particular embodiment shown, drivetrain 210 is an all-wheel drive system incorporating a power transmission device 220 for transmitting drive torque from engine 216 and transmission 218 to front driveline 212 and rear driveline 214. Power transmission device 220 is shown constructed as a power take-off unit.

Front driveline 212 is shown to include a pair of front wheels 224 individually driven by a first front axle shaft 226 and a second front axle shaft 228, as well as a front differential assembly 232. Power take-off unit 220 includes a reduction speed gearset 230, a first disconnect clutch 234 and a torque transfer assembly having a transfer gearset 235 and a right-angled hypoid gearset 236.

Rear driveline 214 includes a propeller shaft 238 connected at a first end to an output component of hypoid gearset 236 and at an opposite end to an input component of a torque coupling 239. An output component of torque coupling 239 is connected to a rear drive axle assembly 240. Rear driveline 214 also includes a pair of rear wheels 242 individually driven by a first rear axle shaft 244 and a second rear axle shaft 246. Rear axle assembly 240 also includes a second hypoid gearset 248 driving a rear differential assembly 250. A second disconnect clutch 252 is selectively actuated to drivingly connect and disconnect second rear axle shaft 246 from hypoid gearset 248 and differential assembly 250.

Reduction speed gearset 230 of power take-off unit 220 includes a drive gear 256 fixed for rotation with an output shaft of transmission 218. A driven gear 258 is in constant meshed engagement with drive gear 256 and is also fixed for rotation with a carrier 260 of front differential assembly 232. Differential assembly 232 includes a first side gear 262 fixed for rotation with first front axle shaft 226 and a second side gear 264 fixed for rotation with second front axle shaft 228. Each of first and second side gears 262, 264 are in meshed engagement with pinion gears 266, 268 which are rotatably supported by carrier 260.

Power take-off unit 220 also includes an input shaft 276 supported for rotation about a first axis within a housing (not shown). Input shaft 276 is fixed for rotation with driven gear 258 or with carrier 260 of front differential assembly 232. Transfer gearset 235 includes a first transfer gear 278 that is supported on second front axle shaft 28 for rotation about the first axis. Transfer gearset 235 also includes a second transfer gear 280 that is in meshed engagement with first transfer gear 278 and which is fixed for rotation with a ring gear 282 of right-angled hypoid gearset 236. Second transfer gear 280 and ring gear 282 are fixed to a stub shaft 284 for rotation about a second axis generally parallel to the first axis. First disconnect clutch 234 is operable to selectively drivingly interconnect input shaft 276 and drive gear 278. Disconnect clutch 234 includes a first hub 286 fixed for rotation with input shaft 276. An axially moveable mode sleeve 288 is in splined engagement with hub 286. A second hub 290 is fixed for rotation with first transfer gear 278 and includes an external spline 292. First disconnect clutch 234 also includes a blocker ring 294 positioned between first hub 286 and second hub 290. Blocker ring 294 functions to assure that the rotational speed of input shaft 276 is substantially the same as first transfer gear 278 prior to allowing a driving connection between hub 286 and second hub 290 via mode sleeve 288. It should be appreciated that an alternate synchronizer clutch (not shown) may not require a blocker ring to function properly.

A clutch actuation mechanism 296 includes a shift fork 298 slidingly positioned with a groove 300 formed in mode sleeve 288. A power-operated clutch actuator 302 is operable to move fork 298 and mode sleeve 288 from a first position where sleeve 288 is disengaged from spline 292 and a second position where mode sleeve 288 concurrently drivingly engages first hub 286 and second hub 290.

Right-angled hypoid gearset 236 includes ring gear 282 and a pinion gear 308 in meshed engagement with ring gear 382. Pinion gear 308 is supported in the housing for rotation about a third axis that is transversely oriented relative to the second axis. As will be detailed, pinion gear 308 is associated with a shaft assembly 310. Shaft assembly 310 is adapted to be interconnected to the first end of propshaft 238. Disconnect clutch 234 may be placed in an activated mode where drive torque is transferred between input shaft 276 and first transfer gear 278. Disconnect clutch 234 is also operable in a deactivated mode where no drive torque is transferred to rear driveline 214. Power from engine 216 is not transferred to right-angled drive assembly 236 when first disconnect clutch 234 is in its deactivated mode.

Returning to FIG. 6, torque coupling 239 is depicted as a friction clutch that is fixed to rear axle assembly 240. Rear axle assembly 240 includes rear differential assembly 250, rear axle shaft 244, rear axle shaft 246 and second disconnect clutch 252. Differential assembly 250 includes a carrier housing 314 fixed for rotation with a ring gear 315 of ring and pinion gearset 248. Differential assembly 250 also includes first and second side gears that are fixed for rotation with first and second rear axle shafts 244, 246, respectively. A pair of pinion gears are positioned within carrier housing 314 and placed in constant meshed engagement with the side gears. Friction coupling 239 includes a drum 320 fixed for rotation with a second end of propeller shaft 238. A hub 322 is fixed for rotation with a pinion shaft 324. A pinion gear 326 of pinion gearset 248 may be integrally formed with pinion shaft 324. Outer clutch plates 328 are splined for rotation with drum 320. A plurality of inner clutch plates 330 are splined for rotation with hub 322 and interleaved with outer clutch plates 328. A power-operated clutch actuator 334 is operable to apply a clutch actuation force to clutch plates 328, 330 and transfer drive torque through friction coupling 239. In one example, an axially moveable piston may be in receipt of pressurized fluid to provide the actuation force. Alternatively, an electric motor may cooperate with a force multiplication mechanism. In yet another embodiment described below in greater detail, the friction clutch may be actuated based on wheel slip or a difference in rotational speed across the friction clutch.

Second disconnect clutch 252 is depicted in FIG. 6 as a dog clutch. Disconnect clutch 252 includes a first hub 340 fixed for rotation with a shaft 342 drivingly engaged with one side gear of differential assembly 250. An external spline 346 is formed on first hub 340. An axially translatable disconnect sleeve 348 is in splined engagement with first hub 340. A second hub 350 is fixed for rotation with rear axle shaft 246. A spline 352 is formed on an outer periphery of second hub 350. A dog clutch actuation system 356 includes a fork 358 slidably positioned within a groove formed in disconnect sleeve 348. A power-operated actuator 362 is operable to translate fork 358 and disconnect sleeve 348 between a first position where sleeve 348 is engaged only with first hub 340 and a second position where sleeve 348 simultaneously engages splines 346 and 352 to drivingly interconnect shaft 342 with rear axle shaft 246. A controller 370 is in communication with one or more vehicle sensors 372 for automatically controlling actuation of first disconnect clutch 334, torque coupling 239 and second disconnect clutch 252 to shift drivetrain 210 between its two-wheel drive mode and its all-wheel drive mode.

Figure 7:
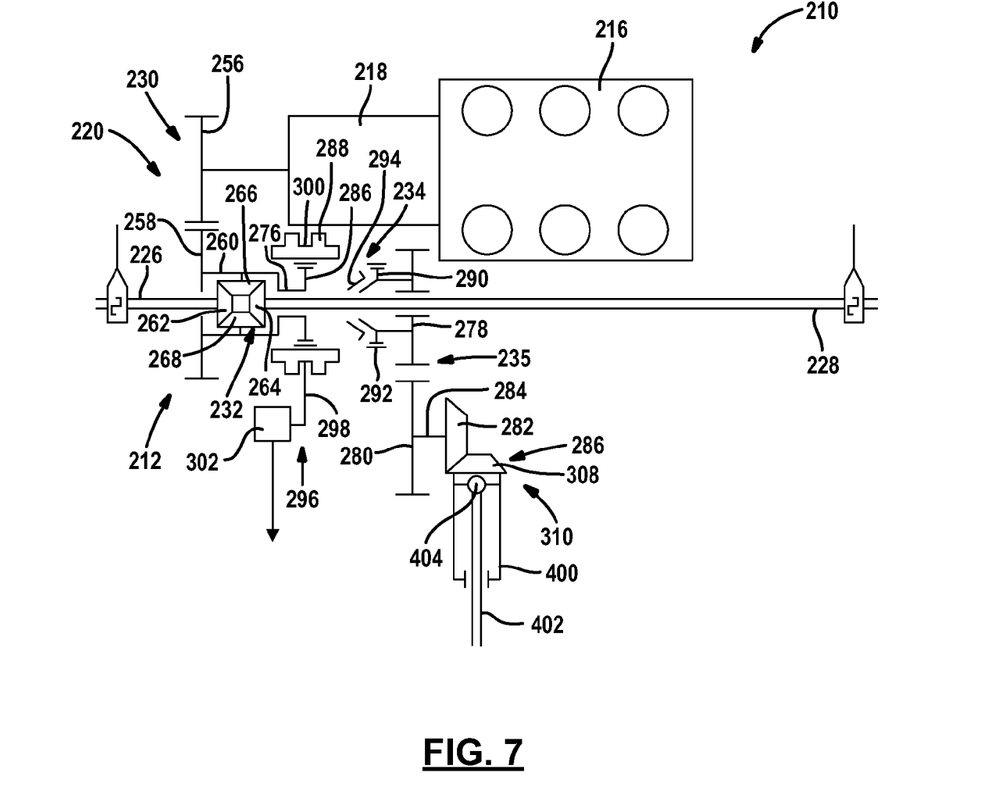
FIG. 7 is an enlarged portion of the schematic illustration of the power transmission device shown in FIG. 6.

As schematically shown in FIGS. 6 and 7, shaft assembly 310 includes a shell unit 400 fixed for rotation with pinion gear 308 of hypoid gearset 236, an output shaft 402 attached to the first end of propshaft 238, and a cardan joint 404 drivingly interconnecting shell unit 400 to output shaft 402. The construction and general configuration of front shaft assembly 32 shown in FIGS. 3 through 5 is considered to be well-suited for use as shaft assembly 310 except that cylindrical driven gear 58 has been replaced with pinion gear 308 of hypoid gearset 236. As seen, first transfer gear 278 is arranged to rotate about the first axis coaxially aligned with the rotary component of first driveline 212. Second transfer gear 280, shaft 284 and ring gear 282 are arranged to rotate about the second axis that is offset from and generally parallel to the first axis. Pinion gear 308 is rotatably supported in the power take-off housing for rotation about the third axis that is aligned to be transverse in relationship to the first and second rotary axes. Joint 404 functions to permit output shaft 402, also known as a pinion shaft, to move angularly relative to the third axis while rotating about its fourth axis. Specifically, joint 404 includes a cross having first trunnions supported by shell unit 400 and second trunnions supported by pinion shaft 402 is a generally similar arrangement to that shown in FIGS. 3-5 to provide a serviceable shaft assembly 310 having a multi-piece shell unit 400 which defines a cavity within which joint 404 is retained.

Figure 8:
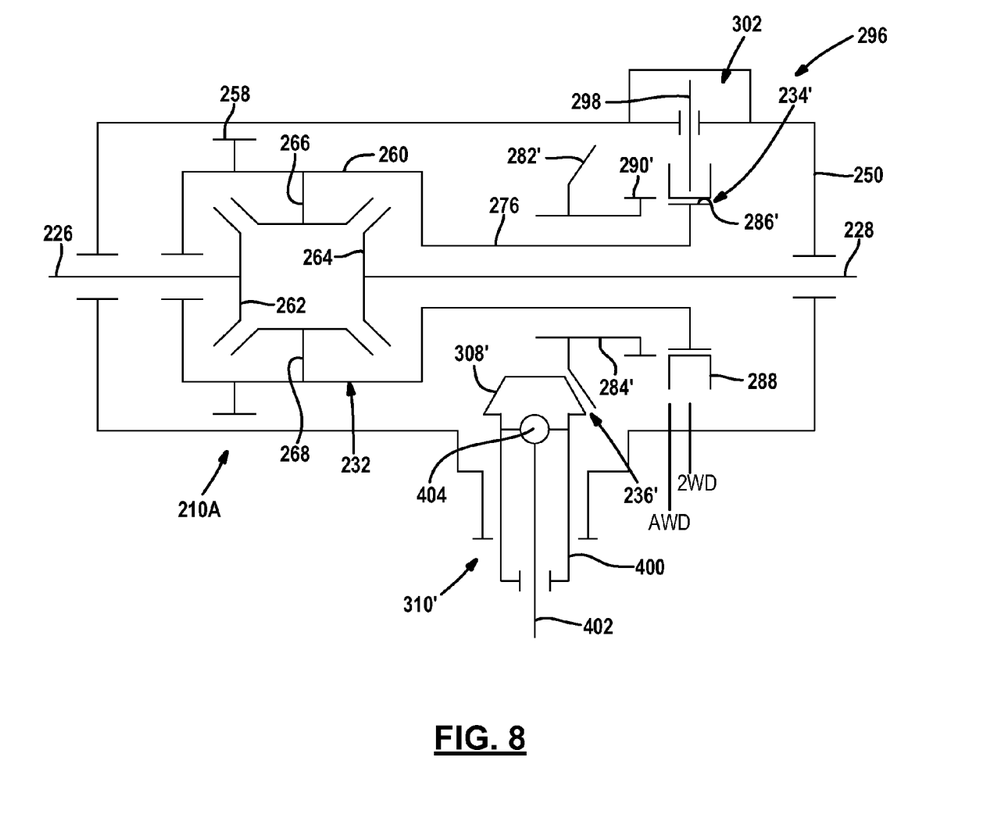
FIGS. 8 is a schematic of an alternative construction for a power take-off unit adapted for use with the all-wheel drivetrain shown in FIG. 6.

FIG. 8 illustrates an alternative construction for power take-off unit 210A that is generally similar to power take-off unit 210 of FIG. 7 with the exception that a modified transfer assembly is employed to provide a more compact arrangement. As seen, ring gear 282' of hypoid gearset 236' includes a stub shaft 284' coaxially surrounding input shaft 276. As such, ring gear 282' and shaft 284' rotate about the first axis. Mode sleeve 288 is slideably mounted on external splines of hub 286' is axially moveable relative to hub 290' fixed stub shaft 284' between a disconnect (2WD) position and a connected (AWD) position. Despite the optional arrangement for the transfer assembly, pinion shaft assembly 310' still includes a shell unit 400 fixed for rotation with pinion gear 308'; a pinion shaft 402, and a joint unit 404 drivingly interconnecting shell unit 400 to pinion shaft 402 to permit angular movement therebetween. Shell unit 400 is rotatably mounted by bearings (not shown) to housing 250. Furthermore, those skilled in the art will recognize and appreciate that first disconnect couplings 234, 234' can be easily substituted with other types of power-operated clutch systems including multi-plate friction clutches actuated hydraulically, electromechanically, electromagnetically or mechanically, as well as other type of power-operated on-off type of clutch systems.

Figure 9:
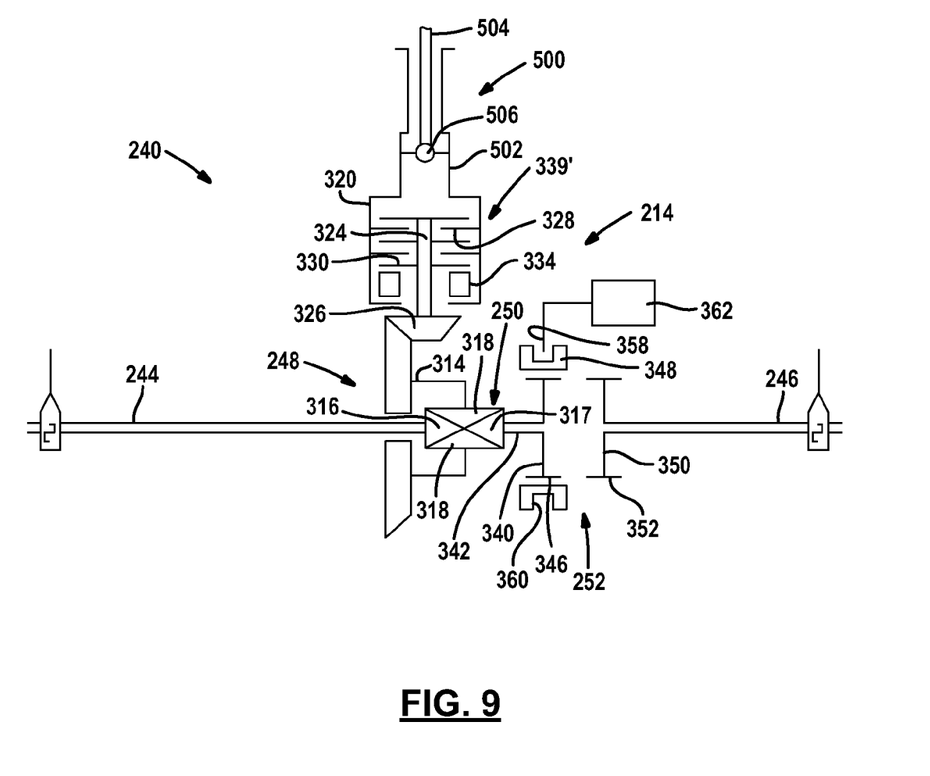
FIG. 9 is a schematic of a power transmission device adapted for use with the all-wheel driveline of FIG. 6 and constructed as an axle drive module.

Referring now to FIG. 9, rear axle assembly 240 of FIG. 6 has been modified such that torque coupling 339' includes a shaft assembly 500 adapted for connection to the second end of propshaft 238. In particular, shaft assembly 500 is shown schematically to include a shell unit 502 fixed for rotation with clutch driven housing 320, a coupling shaft 504, and a joint unit 506 disposed in a cavity formed in shell unit 502 disposed in a cavity formed in shell unit 502 and drivingly interconnecting coupling shaft 504 to shell unit 502. The general configuration of shell unit 502, shaft 504 and joint unit 506 are contemplated to be similar in structure and function to similar components previously disclosed in relation to shaft assembly 310, 310'. Coupling shaft 504 is adapted to be coupled to the second end of propshaft.

The foregoing discussion discloses and describes various embodiments of the present disclosure. One skilled in the art will readily recognize from such discussion, and from the accompanying drawings and claims, that various changes, modifications and variations can be made therein without departing from the true spirit and fair scope of the disclosure as defined in the following claims.

What is claimed is:

1. A power take-off unit for a motor vehicle having first and second drivelines and a power source transmitting drive torque to the first driveline, the power take-off unit comprising:
    an input shaft driven by the power source;
    an output shaft drivingly interconnected to the second driveline;
    a hypoid gearset for transmitting drive torque from said input shaft to said output shaft, said hypoid gearset including a ring gear driven by said input shaft and a pinion gear having pinion gear teeth meshed with ring gear teeth formed on said ring gear, said pinion gear including a shell unit having a first shell portion secured to a second shell portion so as to define a cavity therebetween, wherein said output shaft extends through said second shell portion and said pinion gear teeth are formed on said first shell portion; and
    a cardan joint positioned within said cavity formed in said shell unit and drivingly interconnecting said pinion gear and said output shaft and configured to permit pivotal movement of said output shaft relative to said pinion gear, wherein said cardan joint includes a yoke secured to said output shaft and a cross having a pair of first trunnions pivotably coupled to said yoke and a pair of second trunnions pivotably coupled to said shell unit.

2. The power take-off unit of claim 1 wherein said input shaft and said ring gear are rotatable about a first rotary axis, wherein said pinion gear is rotatable about a second rotary axis disposed transversely relative to said first rotary axis, wherein said output shaft is rotatable about a third rotary axis, and wherein said cardan joint permits said output shaft to pivot relative to said pinion gear so as to vary the orientation of said third rotary axis relative to said second rotary axis.

3. The power take-off unit of claim 1 further including a transfer gearset disposed between said input shaft and said hypoid gearset, said transfer gearset including a first transfer gear driven by said input shaft about a first rotary axis and a second transfer gear driven by said first transfer gear about a second rotary axis, wherein said ring gear is driven by said second transfer gear about said second rotary axis, wherein said pinion gear is rotatable about a third rotary axis disposed transversely relative to said second rotary axis, wherein said output shaft is rotatable about a fourth rotary axis, and wherein said cardan joint is configured to permit said output shaft to pivot relative to said pinion gear so as to vary the orientation of said fourth rotary axis relative to said third rotary axis.

4. The power take-off unit of claim 1 further comprising a clutch assembly operably disposed between said input shaft and said hypoid gearset, and a clutch actuator for shifting said clutch assembly between a released mode and an engaged mode, wherein drive torque is transmitted from said input shaft through said hypoid gearset and said output shaft to the second driveline when said clutch assembly is operating in its engaged mode, and wherein no drive torque is transmitted from said input shaft through said hypoid gearset and said output shaft to the second driveline when said clutch assembly is operating in its released mode.

5. The power take-off unit of claim 1 wherein said pinion gear further includes fasteners for releasably securing said first shell portion to said second shell portion to retain said cardan joint within said cavity.

6. A power take-off unit for an all-wheel drive vehicle having a primary driveline driven by a power source and a secondary driveline, the power take-off unit comprising:
    a rotary input member driven by the power source;
    a rotary output member drivingly interconnected to the secondary driveline;
    a hypoid gearset including a ring gear meshed with a pinion gear;
    a joint disposed within a cavity formed in said pinion gear and drivingly interconnecting said pinion gear to said rotary output member, wherein said joint is configured to permit pivotal movement of said rotary output member relative to said pinion gear; and
    a clutch assembly operable for selectively coupling and uncoupling said ring gear and said rotary input member;
    wherein said rotary input member and said ring gear are rotatable about a first rotary axis, wherein said pinion gear is rotatable about a second rotary axis oriented transversely to said first rotary axis, wherein said rotary output member is rotatable about a third rotary axis, wherein said joint permits said rotary output member to pivot relative to said pinion gear so as to vary the orientation of said third rotary axis relative to said second rotary axis, wherein said joint is a Cardan joint having a yoke secured to said rotary output member and a cross having first trunnions pivotably mounted to said yoke and second trunnions pivotably mounted to said pinion gear, wherein said pinion gear includes a shell unit having a first shell portion secured to a second shell portion so as to define said cavity therebetween, wherein said second trunnions are pivotably mounted to said second shell portion, wherein said output member is a pinion shaft extending through a bore formed in said second shell portion, and wherein said pinion gear includes gear teeth formed on said first shell portion.

7. The power take-off unit of claim 6 wherein said clutch assembly is operable in an engaged mode to couple said ring gear for driven rotation with said rotary input member and is further operable in a released mode to uncouple said ring gear from driven connection with said rotary input member, and wherein a clutch actuator is operable for shifting said clutch assembly between its engaged and released modes.

8. A power take-off unit for use in an all-wheel drive vehicle having a primary driveline driven by a power source and a secondary driveline, the power take-off unit comprising:
   a rotary input member driven by the power source about a first rotary axis associated with the primary driveline;
   a transfer assembly including a hypoid gearset and a clutch assembly, said hypoid gearset including a ring gear supported for rotation about said first rotary axis and a pinion gear meshed with said ring gear and supported for rotation about a second rotary axis that is transversely oriented relative to said first rotary axis, said clutch assembly being operable for selectively connecting and disconnecting said ring gear and said rotary input member; and
   a shaft assembly drivingly interconnecting said pinion gear to the secondary driveline, said shaft assembly including a shell unit fixed for rotation with said pinion gear about said second rotary axis, a rotary output member interconnected to the secondary driveline and aligned for rotation about a third rotary axis, and a cardan joint drivingly interconnecting said shell unit to said rotary output member and configured to permit pivotal movement of said rotary output member relative to said shell unit so as to vary the orientation of said third rotary axis relative to said second rotary axis, said shell unit including a first shell portion to which said pinion gear is fixedly secured and a second shell portion fixedly secured to said first shell portion and configured to define a joint cavity therebetween, said cardan joint disposed in said joint cavity and including a yoke component coupled for rotation with said rotary output member and a cross component having first trunnions pivotably coupled to said yoke component and second trunnions pivotably coupled to said shell unit.

9. The power take-off unit of claim 8 wherein said clutch assembly is operable in an engage mode to connect said ring gear for rotation with said rotary input member and transmit drive torque through said hypoid gearset and said shaft assembly to the secondary driveline, and wherein said clutch assembly is operable in a released mode to disconnect said ring gear from driven connection with said rotary input member to prevent the transfer of drive torque to the secondary driveline.

10. A power take-off unit for use in an all-wheel drive vehicle having a primary driveline driven by a power source and a secondary driveline, the power take-off unit comprising:
    a rotary input member driven by the power source;
    a rotary output member drivingly interconnected to the secondary driveline;
    a hypoid gearset including a ring gear having ring gear teeth meshed with pinion gear teeth formed on a pinion gear, said pinion gear including a shell unit having a first shell portion secured to a second shell portion so as to define a cavity therein;
    a transfer gearset disposed between said rotary input member and said hypoid gearset, said transfer gearset including a first transfer gear aligned with said rotary input member for rotation about a first rotary axis and a second transfer gear meshed with said first transfer gear and drivingly coupled to said ring gear for common rotation about a second rotary axis, wherein said pinion gear is aligned for rotation about a third rotary axis that is oriented transversely relative to said second rotary axis;
    a cardan joint disposed within said cavity and drivingly interconnecting said rotary output member to said pinion gear, said cardan joint including a yoke secured to said rotary output member and a cross having first trunnions pivotably coupled to said yoke and second trunnions pivotably coupled to said second shell portion of said shell unit, wherein said rotary output member extends through a bore formed in said second shell portion and said pinion gear teeth are formed on said first shell portion, wherein said rotary output member rotates about a fourth rotary axis such that said cardan joint permits said rotary output member to pivot relative to said pinion gear so as to vary the orientation of said fourth rotary axis relative to said third rotary axis; and
    a clutch assembly operable for selectively coupling and uncoupling said first transfer gear to said rotary input member.

11. The power take-off unit of claim 10 wherein said clutch assembly is operable in an engaged mode to couple said first transfer gear for rotation with said rotary input member and is further operable in a released mode to uncouple said first transfer gear from said rotary input member, and wherein a clutch actuator is operable for shifting said clutch assembly between its engaged and released modes.

\* \* \* \* \*